United States Patent [19] Dybel et al.

[11] 4,335,614

[45] Jun. 22, 1982

[54] WATERPROOF STRAIN SENSING DEVICE

[75] Inventors: Frank R. Dybel; William F. Dybel, both of Olympia Fields; Kenneth MacDonald, Deerfield, all of Ill.

[73] Assignee: International Measurement & Control Company, Frankfort, Ill.

[21] Appl. No.: 160,944

[22] Filed: Jun. 19, 1980

[51] Int. Cl.³ .......... G01B 7/16

[52] U.S. Cl. .......... 73/774

[58] Field of Search .......... 73/774, 862.54, 862.64, 73/777; 310/338, 340

[56] References Cited

U.S. PATENT DOCUMENTS 2,562,741 7/1951 Roberts et al. .......... 310/340 X 3,858,440 1/1975 Budraitis .......... 73/774 X

*Primary Examiner*—Jerry W. Myracle

*Attorney, Agent, or Firm*—Leydig, Voit, Osann, Mayer & Holt, Ltd.

[57] ABSTRACT

A strain sensing device for measuring deformation experienced by a force carrying member. The transducer includes a strain sensing element, terminal blocks, and cable terminal connections all protectively contained within a water and contaminant resistant enclosure. The transducer enclosure includes a tubular sheath within which the sensing element and terminal blocks are housed, and a pair of rubber bushings located in opposed ends of the sheath and each formed with an axial passageway. A ball is tightly held in the axial passageway of each bushing for sealing the interior of the sheath while permitting the direct transmittal of forces to the sensing element via said balls and terminal blocks.

15 Claims, 3 Drawing Figures

WATERPROOF STRAIN SENSING DEVICE

DESCRIPTION OF THE INVENTION

The present invention relates generally to load monitoring systems, and more particularly to strain sensing transducers for use with such systems.

Various types of transducers are known for sensing deformation of structural machine members, such as the pitmans of production presses, and providing electrical signals for use with load indication and/or control circuitry. Piezoelectric transducers, such as shown in applicant's U.S. Pat. No. 4,010,679, have been found particularly well suited for such purpose.

Because such load monitoring systems are utilized in industrial plants on a wide variety of production machinery, they commonly are subjected to oil leakage, water spills, grease, grit, machine filings, and the like, which in some instances have been found to short the transducer output terminal connections, or otherwise adversely effect the output of the transducer.

It is an object of the present invention to provide an improved strain sensing transducer which may be used on machines that are subjected to extreme environmental conditions without effecting the performance of the transducer.

Another object is to provide a transducer as characterized above in which the sensing element is contained in a water and contaminant resistant enclosure so as to be free of contamination from grease, oil, water, metal shavings, and the like.

A further object is to provide a transducer of the above kind which is relatively simple in construction, and thus, lends itself to economical manufacture.

Other objects and advantages of the invention will become apparent upon reading the following detailed description and upon reference to the drawings in which.

Figure 1:
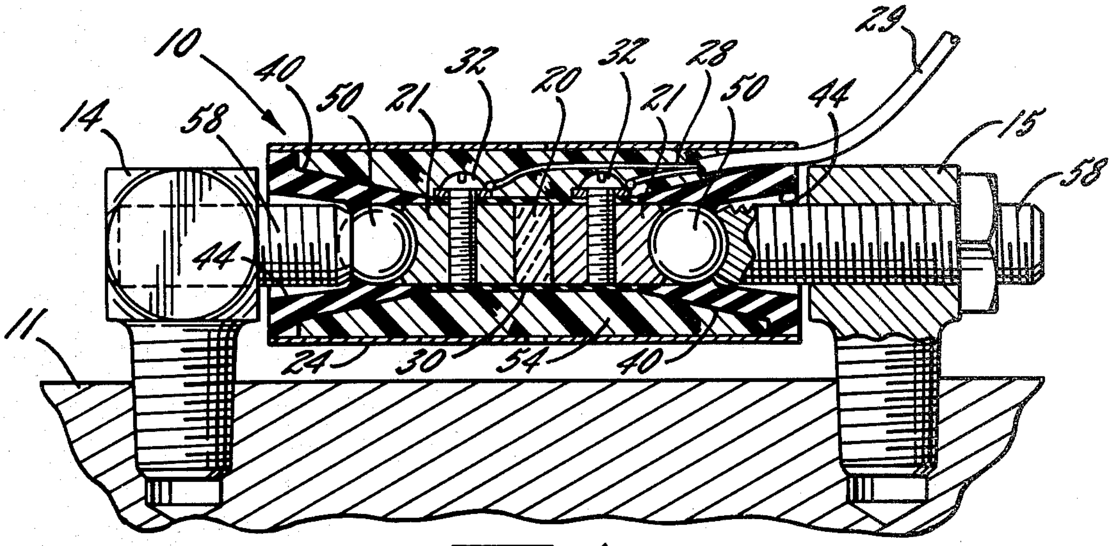
FIG. 1 is a vertical section of a strain sensing transducer embodying the present invention shown mounted on the force carrying member of a machine.
Figure 2:
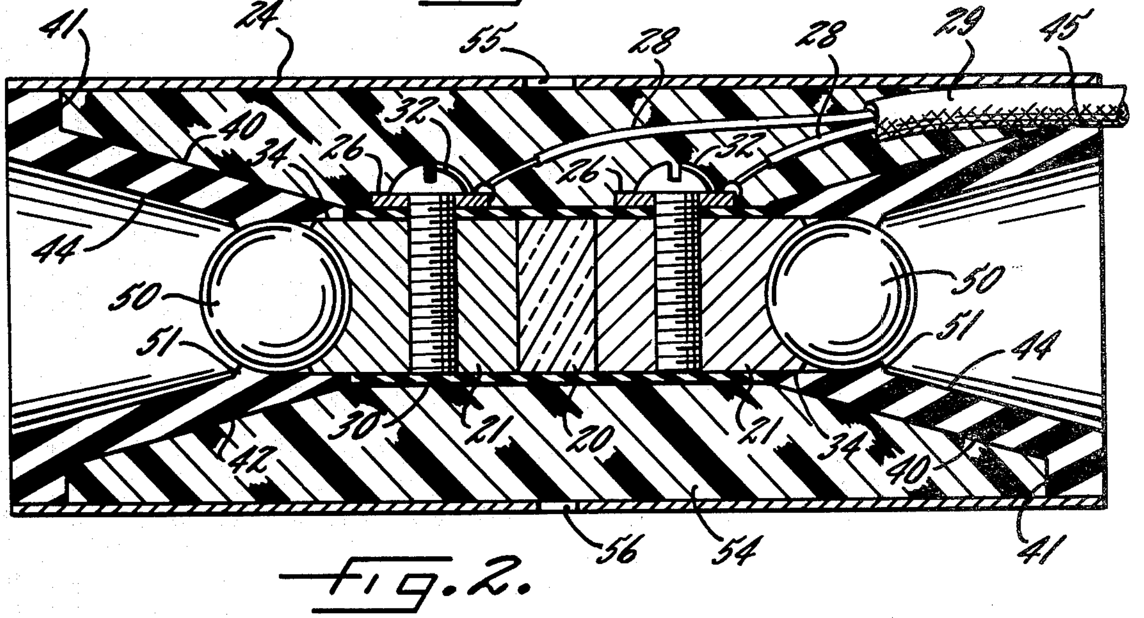
FIG. 2 is an enlarged section of the transducer shown in FIG. 1.
Figure 3:
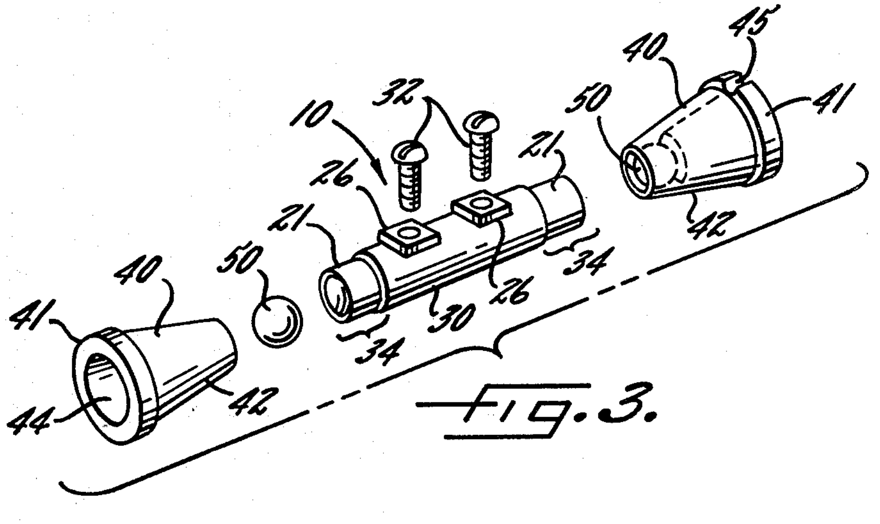
FIG. 3 is an exploded perspective of the transducer shown in FIG. 2 with various of its elements shown disassembled.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, our intention is to cover all modifications, alternative constructions and equivalents falling within the spirit and scope of the invention.

Referring more particularly to the drawings, an illustrative transducer 10 embodying the present invention is shown mounted on a force carrying member 11, such as the pitman of a punch press. The transducer 10 is supported on the member by a pair of brackets 14,15 which in this case are screwed into apertures previously drilled and taped in the member 11. The transducer 10 is clamped between the outer ends of the two brackets 14,15 in spaced relation to the force carrying member 11 to provide a parallel mechanical circuit for shunting portions of strains incurred in the member and applying them to the transducer.

The transducer 10 includes a piezoelectric crystal 20 positioned between terminal blocks 21 with opposed faces of the crystal 20 being in contact with the respective terminal blocks. The terminal blocks 21 and crystal 20 are housed in a metallic tube or sheath 24 which also serves as a magnetic and electric shield. The sheath 24 is slightly larger than the terminal blocks and crystal to provide a space surrounding those elements.

The terminal blocks 21 in this case each has a terminal plate 26 to which leads 28 of a cable 29 may be connected, such as by welding. The cable preferably is a nylon coated shielded cable and extends from the terminal block connections within the sheath out an end of the sheath 24 to a point where it can be connected to an appropriate load indication or control circuit, such as the types shown in applicant Frank R. Dybel U.S. Pat. Nos. 3,612,966, 3,884,068, and 4,062,055.

For facilitating assembly of the transducer, the piezoelectric crystal 20 and terminals 21 are contained within a shrinkable tubing 30 of a known type which is shrunk tightly about the elements so as to hold them in adjacent abutting relation. The shrinkable tubing 30 preferably is applied to the piezoelectric crystal 20 and terminal blocks 21 prior to assembly of the terminal plates 26, which can then be secured to the terminal blocks by screws 32 passing through the tubing 30. The shrinkable tubing 30 in this instance does not extend completely to the ends of the terminal blocks 21, but instead, leaves a small length 34 of the terminal blocks exposed.

In accordance with the invention, means are provided for sealing the piezoelectric crystal, terminal blocks, and terminal connections from water and other contaminents while permitting the direct transfer of forces from the transducer brackets to the piezoelectric crystal. To this end, in the illustrated embodiment, a pair of tapered generally conically shaped rubber bushings 40 are provided in opposite ends of the transducer sheath 24. The bushings 40 each are formed with the outer hub portion 41 that tightly fits within the end of the sheath, a tapered portion 42 extending into the sheath, and an axial passageway 44 extending through the bushing. To permit passage of the cable 29 out the end of the sheath, the bushing hub portion case is formed with a narrow slit 45 which tightly fits about the cable.

For sealing the interior of the transducer from the bushing passageway 44 while providing means for transmitting forces from the transducer brackets 14, 15 to the terminal blocks 21 and crystal 20, a ball 50 is tightly contained within each bushing passageway 44 adjacent the respective terminal blocks 21, which in turn are formed with sockets for receiving the balls. To insure a snug water and contaminant resistant fit of each bushing about its respective ball 50, the portion of the bushing passageway within which the ball is held is formed of a smaller diameter than the ball. To further enhance the water and contaminant resistant seal and to maintain the ball in position within the passageway during assembly of the transducer on the support brackets, each bushing passageway is formed with an annular ridge 51 that bears on the outer exposed surface of the ball 50. The tapered end of the bushing 40 in this case also extends a distance into the transducer beyond the ball so as to be in tight overlapping relation with the end portion 34 of the adjacent terminal block 21.

For further sealing the terminal blocks 21, crystal 20, and cable connections within the sheath 24, as well as insulating the terminals from the sheath 24, the space surrounding the terminal blocks and crystal are filled with an encapsulating and insulating plastic material 54, such as silicone. To permit such plastic encapsulation after assembly of the transducer components, the sheath is provided with a fill hole 55 through which silicone may be introduced to the interior of the sheath and a vent hole 56 is provided on the opposite side of the sheath. It will be seen that the plastic material completely encapsulates the exposed surfaces of the terminal blocks 21, crystal 20, terminal plate 26, terminal plate screws 32, cable leads 28, and the protruding tapered portions 42 of the bushings.

For supporting the transducer 10, the brackets 14, 15 in this case have transverse selectively adjustable screw extensions 58 formed with socket shaped ends for engaging the transducer between the balls 50. To facilitate such ball engagement by the bracket extensions 58, the axial passageway 44 of each bushing 40 is tapered in an outward direction for receiving the end of the respective bracket extension. As is known in the art, the bracket screw extensions 58 may be adjusted to clamp the piezoelectric crystal between the balls 50 so as to prestress the crystal sufficiently that it is maintained in a compressed condition under all conditions of loading on the member 11. The balls 50 preferably are made of a refractory insulating material so as to electrically insulate the brackets 14, 15 from the terminal blocks 21, although alternatively, one of the terminal blocks could be grounded through its bracket and associated ball support.

While the illustrated construction for the transducer shows the transducer mounted by means of brackets 14 and 15 and bracket screw extensions 58, the transducer with its axial passageways 44 in each bushing 40 may also be mounted with a pointed probe substituted for one of the bracket screw extensions 58. Such a probe mounted arrangement is described in applicants' copending applications Ser. No. 160,607, filed June 18, 1980 and Ser. No. 234,795, filed Feb. 17, 1981. In those arrangements the probe is of hardened steel with a socket at one end to engage the ball 50 of the transducer and with a conical point at the other end which engages the end of a bore in the member being measured for strain.

The advantage of the transducer's construction for probe mounted arrangements resides in the tapered passageway 44 of bushing 40 engaging and holding the probe in place thereby facilitating aligning the probe with its mounting bore during installation of the transducer.

It has been found that the foregoing transducer construction effectively seals the piezoelectric crystal, terminal blocks, and cable connections against water, coil, or other contaminants which heretofore have sometimes created shorting of the transducer terminals, or otherwise have adversely effected the output signals of the transducer. While such a water and contaminant resistant transducer construction protectively contains the crystal and transducer terminals, it will be seen that the transducer is still maintained between brackets such that forces exerted on the force carrying member can be transferred directly to the piezoelectric element via the ball supports and terminal blocks. Thus, the water and contaminant resistant enclosure does not effect the sensitivity of the transducers or accuracy of the load monitoring system with which it is used.

We claim as our invention:

1. A sensing device for measuring deformation experienced by a machine force carrying member comprising a transducer; said transducer including a strain sensing element and a pair of output terminals electrically coupled to said strain sensing element, an electrical cable; means connecting an end of said cable to said output terminals; means supporting said transducer on said force carrying member so as to transmit forces incurred by said member to said sensing element; water and contaminant resistant means for sealing said sensing element, output terminals, and cable connecting means from water and other contaminants to which said transducer is exposed on said machine member; said sealing means including an outer sheath within said sensing element and terminals are housed; and flexible bushing means located in opposed ends of said sheath for sealing the interior thereof while permitting the transmission of forces from said support means to said sensing element.

2. The device of claim 1 in which said sensing element is a piezoelectric crystal adapted to provide electrical output signal proportional to the applied loading, and said crystal and terminals are disposed between said support means in a line parallel to the force to be detected.

3. The strain sensing device of claim 2 in which said bushing each has an axial passageway, and a force transmission ball contained within each said bushing passageway for transmitting forces from said support means to said terminals and crystal.

4. A strain sensing device for measuring deformation experienced by a force carrying member comprising a transducer, said transducer including a strain sensing element and a pair of output terminals electrically coupled to said sensing element, an outer sheath within which said sensing element and terminals are housed, an output electrical cable, means connecting an end of said cable to said terminals at points within said sheath, means supporting said transducer on said force carrying member so as to transmit forces incurred by said force carrying member to said sensing element through said terminals, and means for sealing the interior of said sheath from water and contaminants, said sealing means including bushings disposed in opposite ends of said sheath, said bushings each being formed with an outer portion that tightly fits within said sheath and an axial passageway communicating with the interior of such sheath, and means within said bushing passageway for sealing said terminals, sensing element, and cable connecting means within said sheath while permitting the direct transfer of forces from said transducer support means to said terminals and sensing element.

5. The device of claim 4 in which said sealing means further includes a plastic material within said sheath which encapsulates said terminals and sensing element and at least a portion of the bushings extending into said sheath.

6. A device of claim 5 in which each said bushing has an outer hub portion that tightly fits within said sheath and a tapered portion extending into said sheath.

7. The device of claim 6 in which said sheath is a hollow tube and said cable extends from said terminal blocks out an end of said tube.

8. The device of claim 5 in which said cable has an outer nylon coating.

9. The device of claim 8 in which said plastic material is silicone.

10. The device of claim 4 in which said sealing and force transmission means within each said bushing passageway includes a ball interposed between one of said transducer terminals and said transducer support means.

11. The device of claim 10 in which said passageway of each bushing is of a smaller diameter than the ball contained within said passageway.

12. The device of claim 11 in which sensing element is a piezoelectric crystal, a pair of terminal blocks between which said crystal is interposed, and said bushings extend into said sheath with the axial passageway thereof receiving at least a portion of a respective one of the terminal blocks.

13. The device of claim 10 in which each said bushing is formed with an annular ridge within said passageway for engaging the ball contained therein and enhancing the seal between said ball and bushing.

14. The device of claim 10 in which said transducer support means includes a pair of brackets which each have an extension that is received within one of said bushing passageways for engaging the force transmission ball disposed therein.

15. The device of claim 14 in which at least one of said bracket extensions is adjustable for enabling said transducer to be supported between said bracket extensions in a determined prestressed condition.

* * * * *